Feb. 20, 1951 E. W. YOUNG 2,542,956
PIN-SETTING MACHINE
Filed April 23, 1945 4 Sheets-Sheet 1
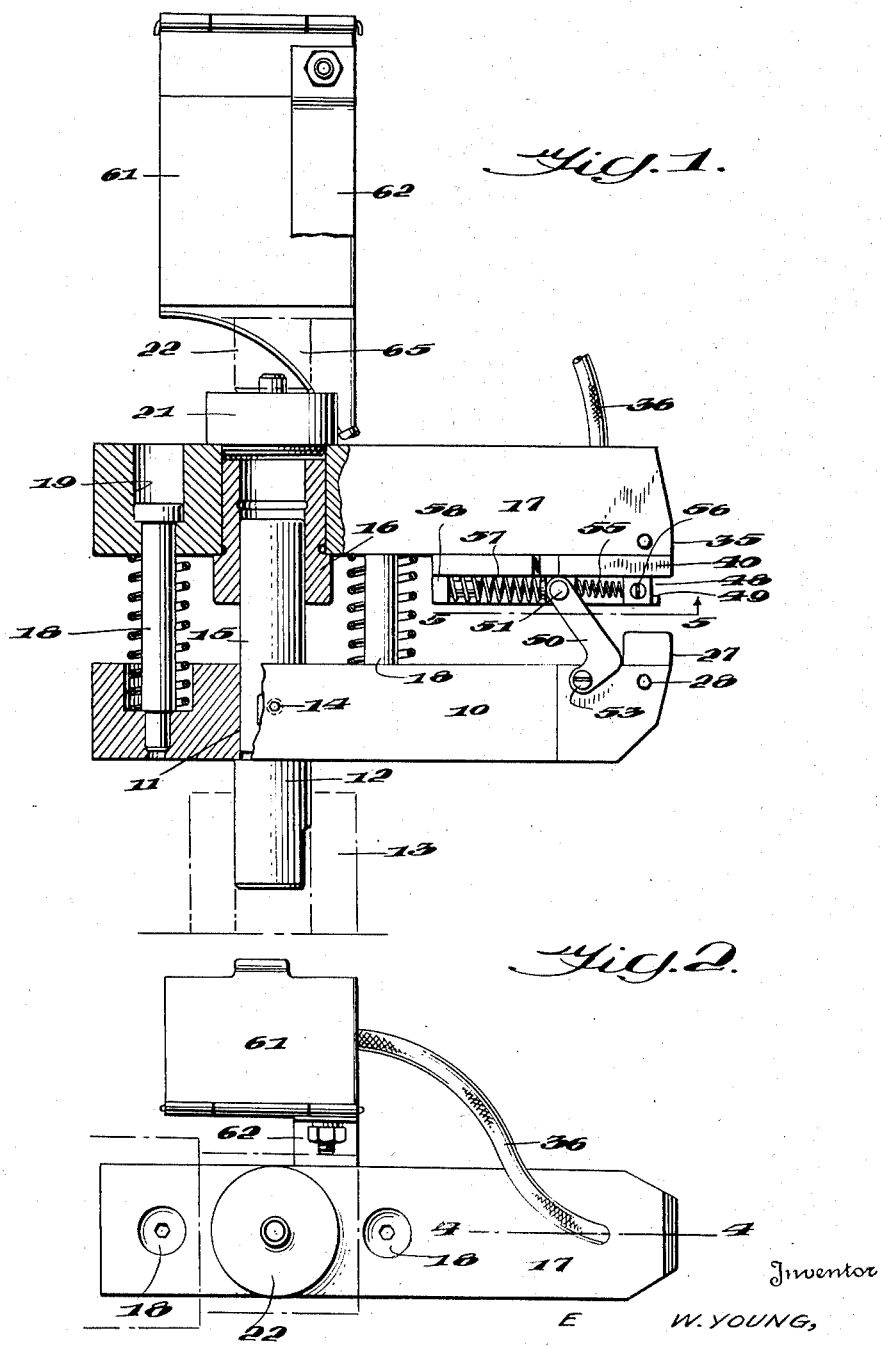

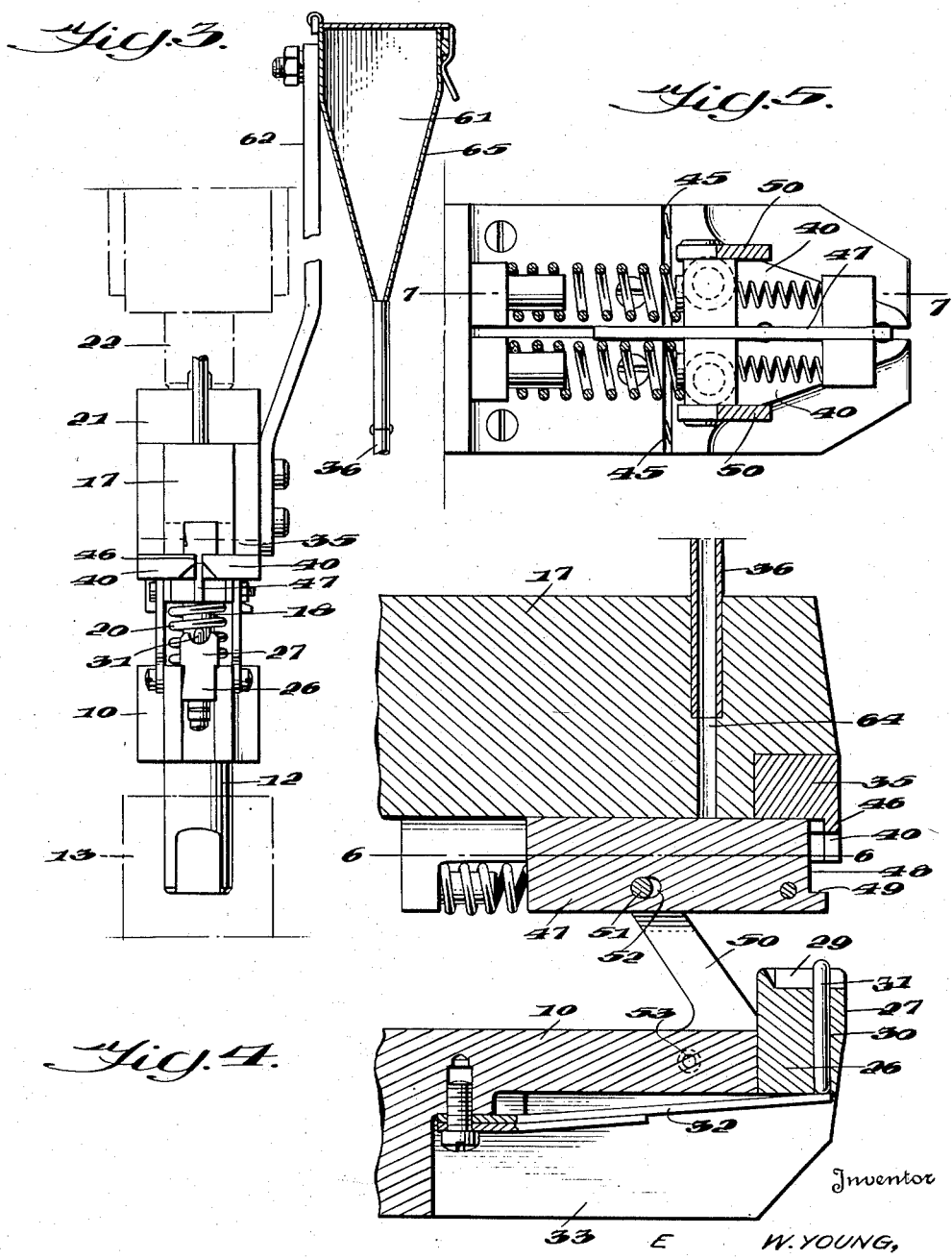

Inventor
E. W. YOUNG,
By Walter D. Jones
Attorney

Feb. 20, 1951      E. W. YOUNG      2,542,956
PIN-SETTING MACHINE
Filed April 23, 1945      4 Sheets-Sheet 4
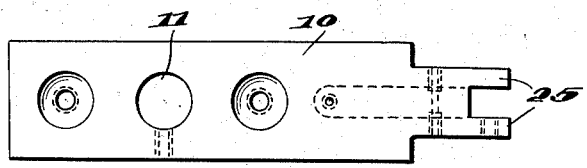
Fig. 10.
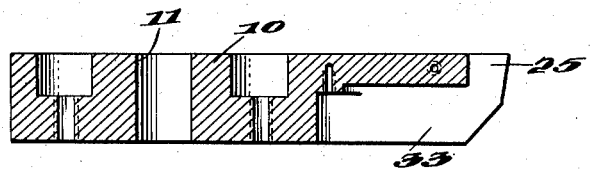
Fig. 11.
Fig. 12.     Fig. 13.
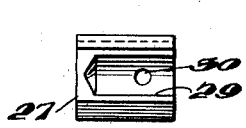 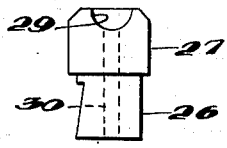
Fig. 14.     Fig. 15.
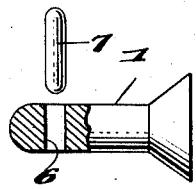 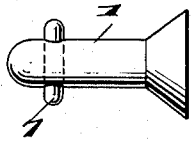
Inventor
E W. YOUNG,
By Walter J Jones
Attorney Patented Feb. 20, 1951

2,542,956

UNITED STATES PATENT OFFICE 2,542,956

PIN-SETTING MACHINE

Edgar W. Young, Los Angeles, Calif., assignor to Northrop Aircraft, Inc., Hawthorne, Calif., a corporation of California Application April 23, 1945, Serial No. 589,769

5 Claims. (Cl. 29—211)

The present invention relates to pin-inserting machines and aims generally to improve existing machines for that purpose.

In the manufacture of certain types of separable fasteners, for example cowling fasteners, one of the fastener parts comprises a stud member having a headed shank and a transverse aperture designed to receive a cross pin for locking engagement with a female or socket part of the fastener. Preferably the fastener studs are mounted in an aperture in the cowling sheet and are retained therein by the head at one end of the shank and the cross pin at or adjacent the opposite end of the shank. The transverse or cross pin is fitted in the stud shank with a pressed fit and must be centrally positioned therein to insure operability of the stud in the cooperating fastener part.

One of the objects of the present invention is in the provision of an improved machine of novel construction for quickly, efficiently and economically inserting the cross pin in fastener studs and the like.

A further object of the invention is to improve and simplify the construction of such pin-inserting machines to the end that the machine may be more smoothly and quickly operated.

A still further object of the invention is the provision of a novel, simple and efficient mechanism for feeding individual pins to and supporting them at a pin-affixing position between the pin presser and workholder.

These and other objects of the invention will be apparent to persons skilled in the art to which the invention pertains from a consideration of the accompanying drawings and annexed specification illustrating and describing one preferred embodiment of the invention.

In the drawings:

Fig. 1 is a side elevation of the pin-feeding and affixing mechanism of the machine, parts being illustrated in section to illustrate better the construction thereof;

Figure 2 is a top plan view of the pin-feeding and affixing mechanism of the machine as illustrated in Fig. 1;

Fig. 3 is a front or end elevation of the pin-feeding and affixing mechanism of the invention as shown in Fig. 2;

Fig. 4 is an enlarged detail vertical sectional view of the mechanism as taken on the line 4—4 of Fig. 2;

Fig. 5 is an enlarged horizontal sectional view as taken on the line 5—5 of Fig. 1;

Fig. 10 is an upper plan view of the lower affixing jaw of the machine;

Fig. 11 is a longitudinal central vertical sectional view thereof;

Fig. 12 is a detail plan view of the replaceable work support;

Fig. 13 is a detail front elevation of the work support;

Fig. 14 is an elevation, partly in section, of a fastener stud and cross pin in disassembled position; and Fig. 15 is an elevation of the assembled fastener stud and cross pin as produced by the machine of the present invention.

Figure 6:
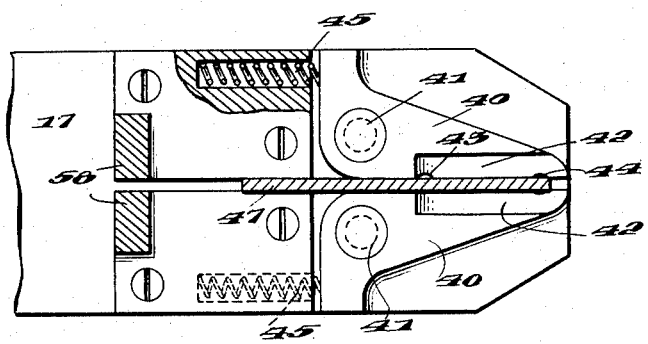
Fig. 6 is a horizontal sectional view as taken on the line 6—6 of Fig. 4.

The particular embodiment of the invention which has been selected for illustration in the accompanying drawings comprises a fixedly mounted workholder and positioner adapted to receive and properly position the part to receive the pin, in the present instance a stud shank, means to feed individual pins to a position above and in axial alignment with an opening in the positioned pin-receiving part, and relatively movable means for forcing the pins into the opening of the pin-receiving part and to set it therein under pressure.

In the illustrated use of the invention the member or part fed to the workholder and which is to receive the pin may comprise a shank 1 of a fastener stud which previously has been positioned in an aperture of a cowling or like sheet or support. The studs are preferably headed at one end, and the nose end may be formed with a transverse aperture 6 to receive a pin 7 which is fed and set in the aperture 6 by a machine of the present invention. The transverse pin 7 not only retains the stud 1 assembled with the cowling sheet, but is adapted to cooperate with a fastener part (not shown) on a support for securing the cowling sheet to such support, as is well understood in the art and explained in the patent to Bedford No. 2,306,928, dated December 29, 1942.

In the illustrated embodiment of the invention, the machine comprises a support or base member 10 which may be suitably fixedly mounted on the machine. For example, the member 10 may be provided with a bore 11 to receive a post 12 mounted in the bed 13 of the machine, and may be fixedly attached to the post 12 as by set screw 14 or like fastening means. The member 10 preferably has an upwardly extending guide 15, as for example an extension of the post 12 adapted slidably to receive a bushing 16 carrying an upper or movable jaw or slide 17. The member 10 may be provided on opposite sides of the guide 15, with posts 18 slidable through openings 19 in the member 17, which posts 18 serve as guides for springs 20 normally holding the members 10 and 17 in separated positions. Movement of the upper or slide member 17 toward the workholder 10 may be effected by any suitable power means, as for example a ram or like part 21 secured to a piston 22 of a suitable actuating device, for example pneumatic press (not shown).

The forward end of the base member 10 may be slotted or bifurcated, as at 25 to removably receive a part 26 of a replaceable workholder 27 which may be fixedly retained in the member 10 by set screw 28.

The replaceable workholder 27 is preferably formed with a semi-cylindrical recess 29 (see Figs. 4, 12 and 13) to receive therein a portion of the cylindrical shank of a fastener stud constituting the workpiece. The workholder 27 is also provided with a vertically disposed bore 30 axially of the pin-affixing position, which bore slidably receives a depressable pilot pin 31 adapted to engage in a portion of the aperture 6 of the stud shank 1 and accurately position the stud shank in the workholder with the aperture in proper axial alignment in the pin-affixing position. The semi-cylindrical recess 29 as well as the diameter of the bore 30 is preferably of a size to accommodate studs of a predetermined length and diameter. When different size studs are to be fitted, a proper size workholder is replaceably mounted between the bifurcations 25 of the base 10. The pilot pin 31 is normally maintained in raised, stud-engaging position by a spring 32 positioned in the recess 33 in the under face of the base member 10 which preferably communicates with the space between the bifurcations 25.

The upper member or slide 17 moves toward and from the base 10 as above explained and is provided with a pin-presser 35 replaceably mounted in vertical axial alignment with the pilot pin of the workholder 27, the coaxial position of the presser head 35 and pilot pin 31 defining a pin-affixing position of the machine.

The invention provides novel means for individually feeding pins to and supporting them in pin-affixing position between the workholder and presser head so as to be readily inserted in the aperture 6 of the stud shank 1. Preferably such means is mounted on one of the members 10 or 17 and is designed to feed pins from a supply tube 36 laterally spaced from the pin-affixing position and through which pins are fed in end-to-end relation. In the illustrated embodiment the pin-feeding and supporting means is mounted on the under face of the movable member or slide 17.

The invention also provides pin-supporting means which may comprise opposed levers 40 herein illustrated as bell crank levers pivoted as at 41 to a support, for example the member 17 and each lever is provided with a substantially straight arm or face 42 of a length at least as great as the distance between the spaced pin-receiving positions 43 and the pin-affixing positions 44, at which points the faces 42 are notched to receive a pin between them. The lever arms including the faces 42 are resiliently urged toward each other as by spring means 45 bearing against a portion of the levers 40 beyond the pivot 41, so as to yieldingly grip and hold a pin 7 at both the positions 43 and 44. Closing movements of the levers toward each other may be limited by a tongue 46 on a suitable part of the machine, for example the presser head 35.

The lever arms 42 are spaced apart a distance slightly greater than the diameter of the pin 7 and form a guide means for a pin-feeding bar or slide 47 reciprocable between them (see Fig. 6). The forward end of the bar 47 is shouldered, providing a vertically disposed pushing face 48 and an angularly disposed horizontal pin-supporting face 49 (see Fig. 4) for supporting and moving a pin from the pin-receiving position 43 to the pin-affixing position 44.

The pin-feeding bar or slide 47 is reciprocably operated between the lever arms 42, as a result of the relative opening and closing movements of the presser head 35 and work-holder 27. One means for accomplishing this action, as illustrated, comprises operating members in the form of crank arm links 50 connected to the slide 47 by means of a transverse pin 51 extending through an elongated opening 52 in the slide. The links 52 may have their shorter crank arms pivoted as at 53 to the member 10 (see Figs. 1 and 4) and their upper ends connected to the ends of cross pin 51, such that closing movement of the presser head 35 moves the slide 47 inwardly to position the pin-supporting face 49 at the pin-receiving position 43. Similarly, as the presser head is raised or opened, the slide 47 is moved outwardly to position the pin-supporting face 49 and the pin-affixing position 44.

Figure 7:
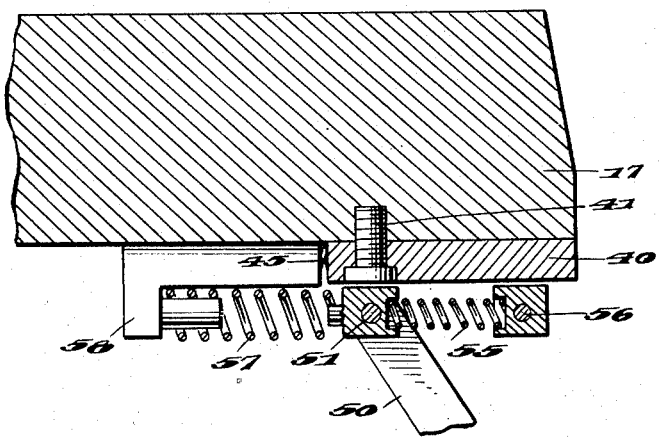
Fig. 7 is a detail longitudinal sectional view as taken on the line 7—7 of Fig. 5.
Figure 8:
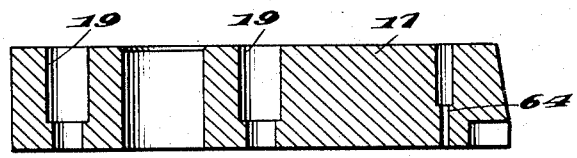
Fig. 8 is a bottom plan view of the upper affixing jaw of the machine.
Figure 9:
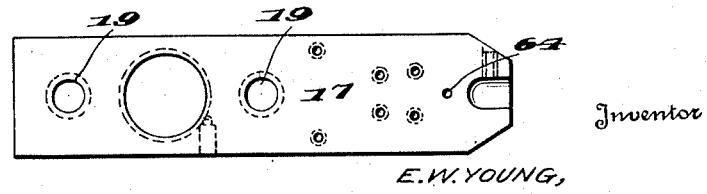
Fig. 9 is a longitudinal central vertical sectional view thereof.

Resilient means are provided for normally urging the slide toward the pin-affixing position at all times and for resiliently positioning the cross pin 51 in the inner end of the elongated slot 52. Such means may comprise spring means 55 mounted between the cross pin 51 and the outer portion of the slide 47, as for example a cross pin 56 fixedly mounted in the slide 47 (see Figs. 5 and 7). Heavier compression springs 57 between the cross pin 51 and a stationary part 58 of the member 17 act to normally urge the slide 47 outwardly to urge the pin-supporting face 49 toward the pin-affixing position 44.

The pins 7 are fed in end-to-end relation to the pin-receiving position 43 of the feeding and holding mechanism by means of a tubular conduit 36 leading to a hopper 61 supported on a standard 62 of the machine. In the illustrated embodiment, where the pin-feeding and holding mechanism is mounted on the under face of the slide 17, the conduit 36 may communicate with a tubular bore 64 in the part 17, which is in axial alignment with the pin-receiving position 43. The hopper 61 may be of a size to hold a substantial supply of pins and may be formed with downwardly converging sides 65 connected to the tubular conduit 36 to insure that the pins are fed to the conduit in end-to-end relation. As the hopper 61 is mounted on the upper end of the standard 62, it is subject to considerable vibration of the machine which agitates the pins in the hopper and insures a continuous supply of pins in the conduit 36.

In operation a stud 1 is inserted through an aperture of a cowling or like sheet and the shank 1 of the stud is positioned in the recess 29 of the workholder 27 with the aperture 6 of the stud vertically disposed. In this position the aperture 6 is engaged by the pilot pin 31 which enters the stud aperture in the pin-affixing position 44.

The work-holding presser head and associated mechanism will be in the position shown in Fig. 4 with the pin-feeding slide 47 in its outermost position, so that the pin-supporting face 49 will support a pin at the pin-affixing position immediately above the aperture 6 of the workpiece. It will be understood that the pin at position 44 is also supported between the forward ends of the supporting lever 40.

As the member 17 is lowered or moved toward the member 10, the pin-feeding slide 47 is retracted by means of the crank arm linkage 50, leaving the pin 7 at the pin-affixing position supported solely by the supporting levers 40. Continued lowering of the member 17 and presser head 35 presses the pin 7 directly from the levers 40 into the stud aperture 6.

In the lowermost position of the presser head, the pin-feeding slide 47 is in retracted position with the pin-supporting face 49 at the pin-receiving position 43 in line with bore 64 to receive a new pin from the conduit 36, when it is supported in part by the face 49 of the slide 47 and in part by the groove of the levers 40 at position 43. As the presser head 35 and the member 17 are raised away from the workholder, the slide 47 moves outwardly to transfer the pin 7 from position 43 to position 44.

The invention is not to be restricted to the particular details of construction shown and described as the scope of the invention is best defined by the appended claims.

I claim:

1. In a machine for inserting a pin in a transverse aperture of a fastener stud, a workholder for receiving a stud, means for positioning a stud therein with the transverse aperture of the stud in vertical position, presser means movable toward and away from said workholder, pin-holding means comprising a pair of opposed pivoted lever arms mounted on said presser means and having opposed surfaces provided with laterally spaced opposed grooves providing a pair of laterally spaced pin-holding positions, means for successively feeding pins to one of said pin-holding positions, the other of said pin-holding positions being adapted and arranged to hold a pin in axial alignment with the aperture of a stud positioned in said workholder, in which position said presser means may engage the pin and drive it into the stud aperture, spring means for tensioning said lever arms toward each other for yieldingly holding a pin successively in said one and in said other pin-holding positions, said pin-feeding bar reciprocably movable between two positions between said opposed surfaces of said lever arms including means for engaging a pin in said one pin-holding position when said bar is in one of said positions and for holding the pin upon the movement of said bar to the other of said positions for transferring a pin successively from said one pin-holding position to said other pin-holding position and leaving the pin at said other pin-holding position upon movement of said bar back from said other position to the said one position.

2. In a machine for inserting a pin in a transverse aperture of a fastener stud having a workholder for receiving a stud, means for positioning a stud therein with the transverse aperture of the stud in a vertical position, and presser means movable toward and away from said workholder, a pin-feeding mechanism comprising: pin-holding means comprising a pair of opposed pivoted lever arms mounted on said presser means and having opposed surfaces provided with laterally spaced pin-holding positions, means for successively feeding pins to one of said pin-holding positions, the other of said pin-holding positions being adapted and arranged to hold a pin in axial alignment with the aperture of a stud positioned in said workholder, in which position said presser means may engage the pin and drive it into the stud aperture, spring means for tensioning said lever arms toward each other for yieldingly holding a pin successively in said one and in said other pin-holding positions, and a pin-feeding bar reciprocably movable between two positions between said opposed surfaces of said lever arms including means for engaging a pin in said one pin-holding position when said bar is at one of said positions and for holding the pin upon the movement of said bar to the other of said positions for transferring a pin from said one pin-holding position to said other pin-holding position and leaving the pin at said other pin-holding position upon movement of said bar back from said other position to said one position.

3. In a machine for inserting a pin in a transverse aperture of a fastener stud having a workholder for receiving a stud, means for positioning a stud therein with the transverse aperture of the stud in a vertical position, and a presser member movable toward and away from said workholder for driving a pin into the transverse aperture of a stud positioned in the workholder, a pin-feeding mechanism comprising: a pair of opposed lever arms pivotally mounted on said presser member and having opposed surfaces, each surface provided with a pair of laterally spaced grooves opposing the grooves of the other surface, providing a pair of laterally spaced pin-holding positions; means for successively feeding pins to one of said pin-holding positions; the other of said pin-holding positions being adapted and arranged to hold a pin in axial alignment with the aperture of a stud positioned in the workholder in position for being driven into said aperture by said pressure member; spring means for tensioning said lever arms toward each other for yieldingly holding a pin successively in said one and in said other pin-holding positions; and a pin-feeding bar reciprocably movable between two positions between said opposed surfaces of said lever arms, and including means for engaging a pin in said one pin-holding position when said bar is at one of said positions and for holding the pin during movement of said bar to the other of said positions for transferring a pin from said one pin-holding position to said other pin-holding position and leaving the pin at said other pin-holding position upon movement of said bar back from said other position to said one position.

4. In a machine for inserting a pin in a transverse aperture of a fastener stud, a workholder for receiving a stud, means for positioning a stud therein with the transverse aperture of the stud in vertical position, presser means movable toward and away from said workholder, a pair of pin-holding members mounted on said presser means and having opposed surfaces provided with laterally spaced opposed grooves providing a pair of laterally spaced pin-holding positions, means for successively feeding pins to one of said pin-holding positions, the other of said pin-holding positions being adapted and arranged to hold a pin in axial alignment with the aperture of a stud positioned in said workholder, in which position said presser means may engage the pin and drive it into the stud aperture, spring means for tensioning said pin-holding members toward each other for yieldingly holding a pin successively in said one and in said other pin-holding positions, said pin-feeding bar reciprocably movable between two positions between said opposed surfaces of said pin-holding members including means for engaging a pin in said one pin-holding position when said bar is in one of said positions and for holding the pin upon the movement of said bar to the other of said positions for transferring a pin successively from said one pin-holding position to said other pin-holding position and leaving the pin at said other pin-holding position upon movement of said bar back from said other position to the said one position.

5. In a machine for inserting a pin in a transverse aperture for a fastener stud having a workholder for receiving a stud, means for positioning a stud therein with the transverse aperture of the stud in a vertical position, and presser means movable toward and away from said workholder, a pin-feeding mechanism comprising: a pair of pin-holding members mounted on said presser means and having opposed surfaces provided with laterally spaced pin-holding positions, means for successively feeding pins to one of said pin-holding positions, the other of said pin-holding positions being adapted and arranged to hold a pin in axial alignment with the aperture of a stud positioned in said workholder, in which position said presser means may engage the pin and drive it into the stud aperture, spring means for tensioning said pin-holding members toward each other for yieldingly holding a pin successively in said one and in said other pin-holding positions, and a pin-feeding bar reciprocably movable between two positions between said opposed surfaces of said pin-holding members including means for engaging a pin in said one pin-holding position when said bar is at one of said positions and for holding the pin upon the movement of said bar to the other of said positions for transferring a pin from said one pin-holding position to said other pin-holding position and leaving the pin at said other pin-holding position upon movement of said bar back from said other position to said one position.

EDGAR W. YOUNG.

REFERENCES CITED

The following references are of record in the file of this patent:

UNITED STATES PATENTS

| Number | Name | Date |
|---|---|---|
| 480,530 | Tobey | Aug. 9, 1892 |
| 552,043 | Crombie | Dec. 24, 1895 |
| 775,215 | Glazier | Nov. 15, 1904 |
| 1,901,459 | Lewis | Mar. 14, 1933 |
| 1,944,360 | Myer | Jan. 23, 1934 |
| 2,215,388 | Butter | Sept. 17, 1940 |
| 2,340,653 | Fiegel | Feb. 1, 1944 |